US00RE46027E

(19) United States
(12) Reissued Patent
Palenius

(10) Patent Number: US RE46,027 E
(45) Date of Reissued Patent: Jun. 7, 2016

(54) METHOD AND APPARATUS FOR TRANSMIT POWER CONTROL

(71) Applicant: Optis Wireless Technology, LLC, Plano, TX (US)

(72) Inventor: Torgny Palenius, Löddeköpinge (SE)

(73) Assignee: Optis Wireless Technology, LLC, Plano, TX (US)

(21) Appl. No.: 14/575,452

(22) Filed: Dec. 18, 2014

Related U.S. Patent Documents

Reissue of:

(64) Patent No.: 6,904,290
Issued: Jun. 7, 2005
Appl. No.: 09/677,131
Filed: Sep. 29, 2000

U.S. Applications:

(60) Provisional application No. 60/156,699, filed on Sep. 30, 1999.

(51) Int. Cl.
*H04B 7/00* (2006.01)
*H04W 52/26* (2009.01)
*H04W 52/16* (2009.01)

(52) U.S. Cl.
CPC ..... *H04W 52/265* (2013.01); *H04W 52/267* (2013.01); *H04W 52/16* (2013.01)

(58) Field of Classification Search
None
See application file for complete search history.

(56) References Cited

U.S. PATENT DOCUMENTS

| | | | |
|---|---|---|---|
| 5,056,109 | A | 10/1991 | Gilhousen et al. |
| 5,257,283 | A | 10/1993 | Gilhousen et al. |
| 5,345,598 | A | 9/1994 | Dent |
| 5,539,728 | A | 7/1996 | Gaiani et al. |

(Continued)

FOREIGN PATENT DOCUMENTS

| | | |
|---|---|---|
| EP | 0893889 A2 | 1/1999 |
| WO | 97/18643 | 5/1997 |
| WO | 98/58461 | 6/1998 |

OTHER PUBLICATIONS

3rd Generation Partnership Project, Technical Specification Group Radio Access Network, Spreading and Modulation (FDD), 3G TS 25.213, V3.1.0.

(Continued)

*Primary Examiner* — Minh Dieu Nguyen
(74) *Attorney, Agent, or Firm* — Vincent J. Allen; Carstens & Cahoon, LLP

(57) ABSTRACT

Transmit power control is achieved by determining a data rate of at least a first channel and controlling the transmit power of the at least first channel based on the determined data rate. The transmit power may be adjusted based on a ratio of power between the at least first channel and a second channel, and the ratio may be adjusted based on the data rate of the first data channel. The first data channel may be a data channel, and the second data channel may be a control channel. The ratio is adjusted such that a power offset between the first channel and the second channel is proportional to the data rate of the first channel. The ratio may be adjusted based on the coding rate, data transmission rate, and/or a rate matching parameter. The transmit power may also be adjusted based on received power control commands. The transmit power may be adjusted in this manner in the uplink or the downlink direction.

20 Claims, 7 Drawing Sheets

(56) References Cited

U.S. PATENT DOCUMENTS

| | | | | |
|---|---|---|---|---|
| 5,603,096 | A * | 2/1997 | Gilhousen et al. | 455/69 |
| 5,634,195 | A | 5/1997 | Sawyer | |
| 5,671,218 | A | 9/1997 | I et al. | |
| 5,722,051 | A | 2/1998 | Agrawal et al. | |
| 5,768,684 | A | 6/1998 | Grubb et al. | |
| 5,794,129 | A | 8/1998 | Komatsu | |
| 5,812,938 | A | 9/1998 | Gilhousen et al. | |
| 5,815,798 | A | 9/1998 | Bhagalia et al. | |
| 5,815,801 | A | 9/1998 | Hämäläinen et al. | |
| 5,870,393 | A | 2/1999 | Yano et al. | |
| 5,873,028 | A | 2/1999 | Nakano et al. | |
| 5,896,411 | A | 4/1999 | Ali et al. | |
| 5,898,740 | A | 4/1999 | Laakso et al. | |
| 5,940,430 | A | 8/1999 | Love et al. | |
| 5,946,346 | A | 8/1999 | Ahmed et al. | |
| 5,956,649 | A | 9/1999 | Mitra et al. | |
| 6,067,446 | A * | 5/2000 | Persson et al. | 455/69 |
| 6,067,458 | A * | 5/2000 | Chen | 455/522 |
| 6,085,107 | A * | 7/2000 | Persson et al. | 455/522 |
| 6,173,007 | B1 * | 1/2001 | Odenwalder et al. | 375/146 |
| 6,173,162 | B1 | 1/2001 | Dahlman et al. | |
| 6,272,354 | B1 * | 8/2001 | Saario | 455/522 |
| 6,334,047 | B1 * | 12/2001 | Andersson et al. | 455/69 |
| 6,496,531 | B1 * | 12/2002 | Kamel et al. | 375/130 |
| 6,529,482 | B1 * | 3/2003 | Lundby | 370/252 |
| 6,603,773 | B2 * | 8/2003 | Laakso et al. | 370/441 |
| 6,671,266 | B1 * | 12/2003 | Moon et al. | 370/342 |
| 2002/0051439 | A1 * | 5/2002 | Kitade et al. | 370/337 |
| 2003/0053426 | A1 * | 3/2003 | Tsunehara et al. | 370/318 |

OTHER PUBLICATIONS

3rd Generation Partnership Project, Technical Specification Group (TSG) RAN WG4 UE Radio Transmission and Reception (FDD) TS 25.101 V3.1.0.

3rd Generation Partnership Project, Technical Specification Group Radio Access Network; Physical Channels and Mappping of Transport Channels onto Physical Channels (FDD) 3G TS 25.211 V3.1.0.

3rd Generation Partnership Project, Technical Specification Group Radio Access Network; Multiplexing and Channel Coding (FDD) 3G TS 25.212. V3.1.0.

3rd Generation Partnership Project, Technical Specification Group Radio Access Network; Physical Layer Procedures (FDD) 3G TS 25.214 V3.1.0.

* cited by examiner

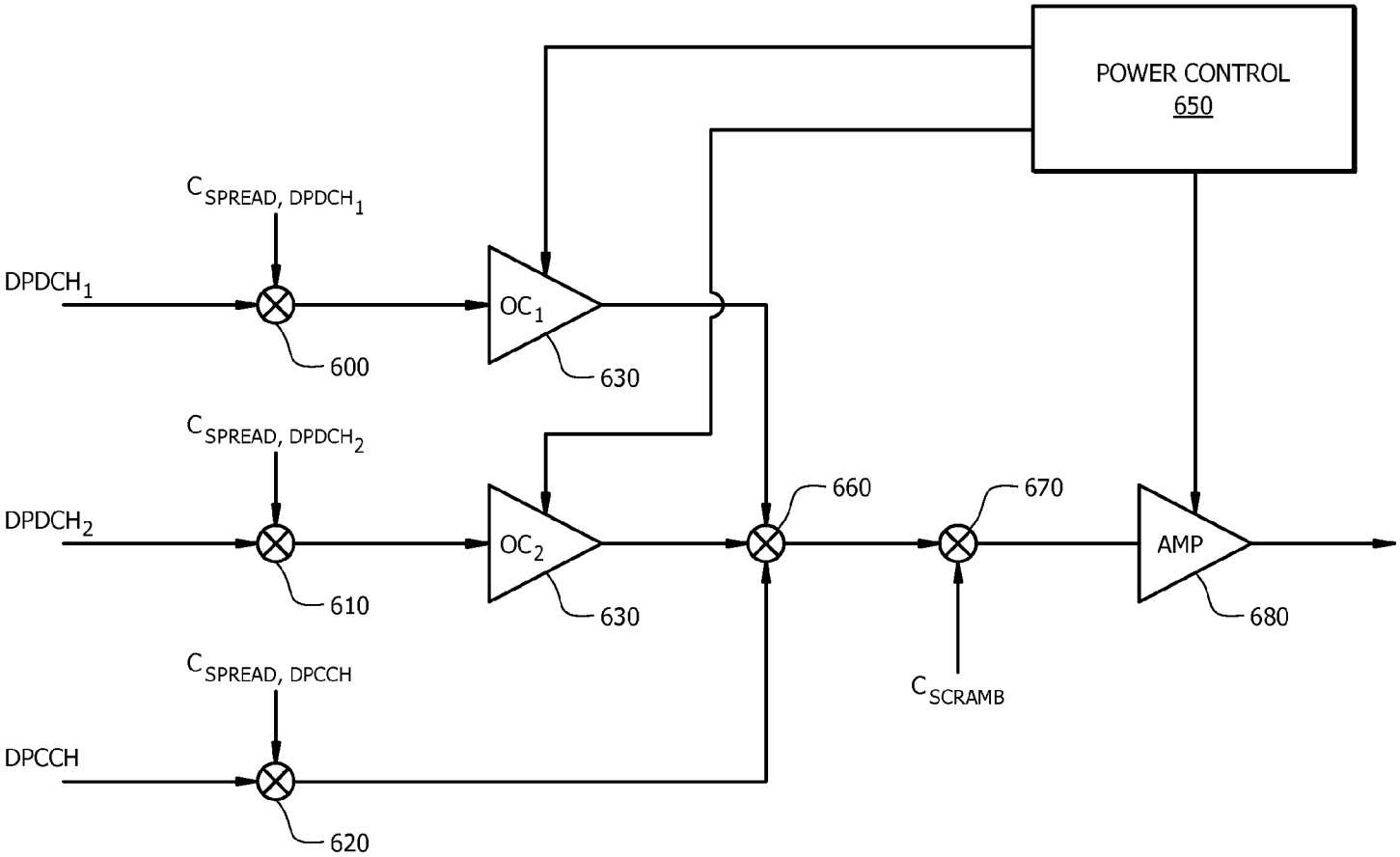
*FIG. 6 (AMENDED)*

METHOD AND APPARATUS FOR TRANSMIT POWER CONTROL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application is related to, and claims priority from, U.S. Provisional Application Ser. No. 60/156,699 entitled "Setting of Power Offset in the Uplink of a Radio Communication System" filed on Sep. 30, 1999, the disclosure of which is expressly incorporated herein by reference.

BACKGROUND

This invention relates to the control of power levels of transmitted signals in telecommunication systems, in particular radiocommunication systems.

Good transmit power control methods are important for communication systems having many transmitters that transmit simultaneously to minimize the mutual interference of such transmitters while assuring high system capacity. As an example, such power control is important for communication systems that use Wideband Code Division Multiple Access (W-CDMA). Depending upon the system characteristics, power control in such systems can be important for transmission in the uplink (i.e., for transmissions from a remote terminal to the network), the downlink (i.e., for transmissions from the network to the remote terminal), or both.

To achieve reliable reception of a signal at each remote station, the signal to interference ratio (SIR) of the received signal should exceed a prescribed threshold for each remote station (referred to as a "required signal-to-interference" level or $SIR_{req}$. For example, as shown in FIG. 1, consider the case in which three remote stations receive, respectively, three signals on a common W-CDMA communication channel. Each of the signals has a corresponding energy level associated with it, namely energy levels E1, E2 and E3, respectively. Also present on the communication channel is a certain level of noise (N). For the first remote station to properly receive its intended signal, the ratio between E1 and the aggregate levels of E2, E3 and N must be above the first remote station's required signal-to-interference ratio $SIR_{req}$.

To improve the SIR of a received signal, the energy of the transmitted signal may be increased, depending on the SIR measured at the receiver. A technique for controlling transmit power in radiocommunication systems in this manner is commonly referred to as a fast power control loop. According to this technique, an initial SIR target is established based upon a desired quality of service (QoS) for a particular connection or service type. For non-orthogonal channels, the actual SIR values measured by a particular remote station or base station can be expressed as:

$$\text{SIR} = \frac{\text{Mean power of received signal}}{\text{Sum of the mean power of all interfering signals}}$$

The SIR is measured by the receiver and is used for determining what power control commands to send to the transmitter. For example, if the measured SIR at a remote station is less than the target SIR, a power control command is sent to the base station, directing the base station to increase the transmit power. Conversely, if the measured SIR is greater than the target SIR, the transmitted power control command instructs the base station to decrease the transmit power.

A slow power control loop can then be used to adjust the SIR target value on an ongoing basis. For example, a remote station receiver can measure the quality of the signal received from the base station using, e.g., known bit error rate (BER) or frame error rate (FER) techniques. Based upon the received signal quality, which may fluctuate during the course of a connection between the transmitter and the receiver, the slow power control loop can adjust the SIR target that is used by the fast power control loop in the remote station to control the uplink transmit power. Similar techniques can be used to control the downlink transmit power.

A drawback to this technique for power control is that increasing the energy associated with signals transmitted to one remote station increases the interference associated with signals transmitted to other nearby remote stations. Thus, radio communication systems must strike a balance between the requirements of all remote stations sharing the same common channel. A steady state condition is reached when the SIR requirements for all remote stations within a given radio communication channel are satisfied. Generally speaking, the balanced steady state may be achieved by transmitting to each remote station using power levels which are neither too high nor too low. Transmitting messages at unnecessarily high levels increases interference experienced at each remote station and limits the number of signals which may be successfully communicated on the common channel, i.e., reduces system capacity.

System capacity is becoming more and more important as consumer demand for radiocommunication services increases. The addition of services such as facsimile, e-mail, video, Internet access, etc. and the desire of users to access different types of services at the same time, e.g., videoconferencing, will require efficient use of system resources.

One technique for handling different types of data communication involves providing a different radio bearer, also referred to as a transport channel or transport format combination (TFC), for each service. A radio bearer provides the capability for information transfer over the radio interface and is characterized by an information transfer rate (i.e., bit rate or throughput) and delay requirements, among other attributes. A radio bearer carries either user data or control signals. Typically, a radio bearer is used for a specific service, e.g., speech. A radio bearer may span several physical channels, or multiple radio bearers may share a physical channel, depending on the bandwidth requirements of each radio bearer.

In addition to one or more radio bearers, a user is typically allocated one or more Physical Data Channels (PDCHs) or Dedicated Physical Data Channels (DPDCHs) which carry user bits. A user or terminal is also typically allocated a Physical Control Channel (PCCH) or a Dedicated Physical Control Channel (DPCCH) on which overhead control information is carried to the user, e.g., bit rate information of the associated PDCHs, transmit power control bits and pilot symbols, at a constant bit rate, which can be used to make the SIR measurements used in the fast power control loop process.

The DPCCH is transmitted at a power level needed to ensure proper power control, i.e., to ensure an adequate quality of the received power control bits. In general, there is a minimum quality of service (QoS) which must be met by the DPCCH, to ensure proper power control. To meet the desired QoS, the power level at which the DPCCH is transmitted must reach at least a minimum level. For example, the DPCCH in W-CDMA is typically transmitted with a constant spreading factor and at a power level needed to ensure proper performance of TFCI decoding and feedback of information in the FBI bits.

A minimum QoS must also be met by the DPDCH. However, the power level of the DPDCH also depends on the data rate.

The DPDCHs and DPCCHs are typically transmitted at different power levels, based on their different requirements. Therefore, there is a power offset between the DPDCHs and the DPCCHs.

Power offsets between the uplink DPDCH and DPCCH channels in an exemplary wideband CDMA system are specified in 3rd Generation Partnership Project, Technical Specification Group Radio Access Network, Spreading and Modulation (FDD), 3G TS 25.213, V3.1.0, the disclosure of which is incorporated here by reference. Examples of power control techniques involving such offsets can be found in U.S. patent application Ser. No. 08/874,907, entitled "Multiple Code Channel Power Control in a Radio Communication System", filed on Jun. 16, 1997, which is incorporated here by reference.

The manner in which these offset values are determined and updated, e.g., as data rates associated with TFCs vary, is not yet defined. In considering how to manage such offsets, it is important to recognize that if the ratio between the transmit power of the DPCCH and the transmit power of the DPDCH is incorrect, then the power control loop which is working on the DPCCH will have the wrong SIR target. This leads either to a degraded performance on the DPDCH, because the $E_b$/lo ratio (received signal to interference ratio) of the DPDCH is decreased compared with previous slots, or to a good quality on the DPDCH but at an unnecessarily high power level which increases the interference on other channels.

Accordingly, there is a need for a technique for managing power offsets between channels, in particular data channels and control channels, in radiocommunication systems.

SUMMARY

It is therefore an object of the present invention to provide a technique for controlling power offsets between data channels and control channels to avoid signal degradation and signal interference.

According to an exemplary embodiment, this and other objects are met by a method and apparatus for controlling transmit power. A data rate of at least a first channel is determined, and the transmit power of the at least first channel is controlled based on the determined data rate. The transmit power may be adjusted based on a ratio of power between the at least first channel and a second channel, and the ratio may be adjusted based on the data rate of the first data channel. The first channel may be a data channel, and the second data channel may be a control channel. The ratio is adjusted such that a power offset between the first channel and the second channel is proportional to the data rate of the first channel. The ratio may be adjusted based on the coding rate, data transmission rate, and/or a rate matching parameter. The transmit power may also be adjusted based on received power control commands. The transmit power may be adjusted in this manner in the uplink or the downlink direction.

BRIEF DESCRIPTION OF THE DRAWINGS

The features and objects of Applicant's invention will be understood by reading this description in conjunction with the drawings, in which:

FIG. 6 illustrates an exemplary implementation for adjusting transmit power in accordance with the present invention.

DETAILED DESCRIPTION

While this description is in the context of cellular communications systems involving portable or mobile radio telephones, it will be understood by those skilled in the art that Applicant's invention may be applied to other communications applications. Moreover, while the invention may be used in W-CDMA communication systems, it also may be used in other types of communication systems.

Figure 1:
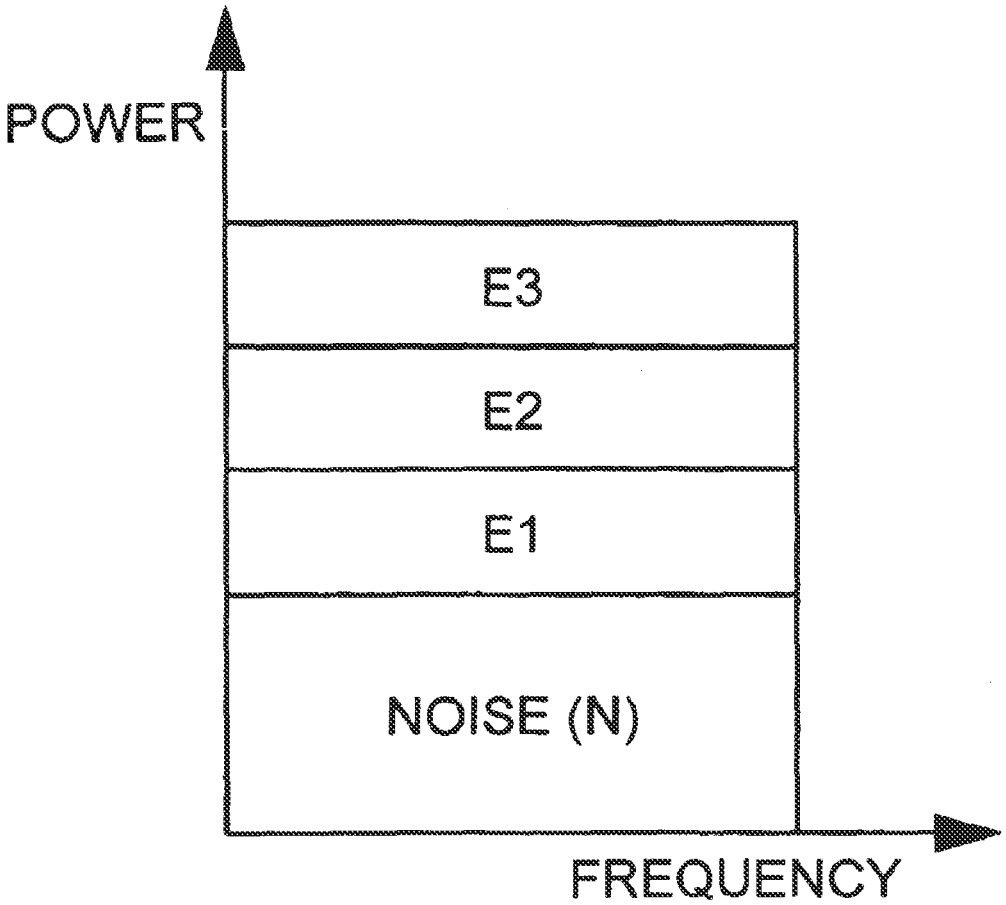
FIG. 1 is a graph of power versus frequency for an exemplary spread spectrum system.
Figure 2:
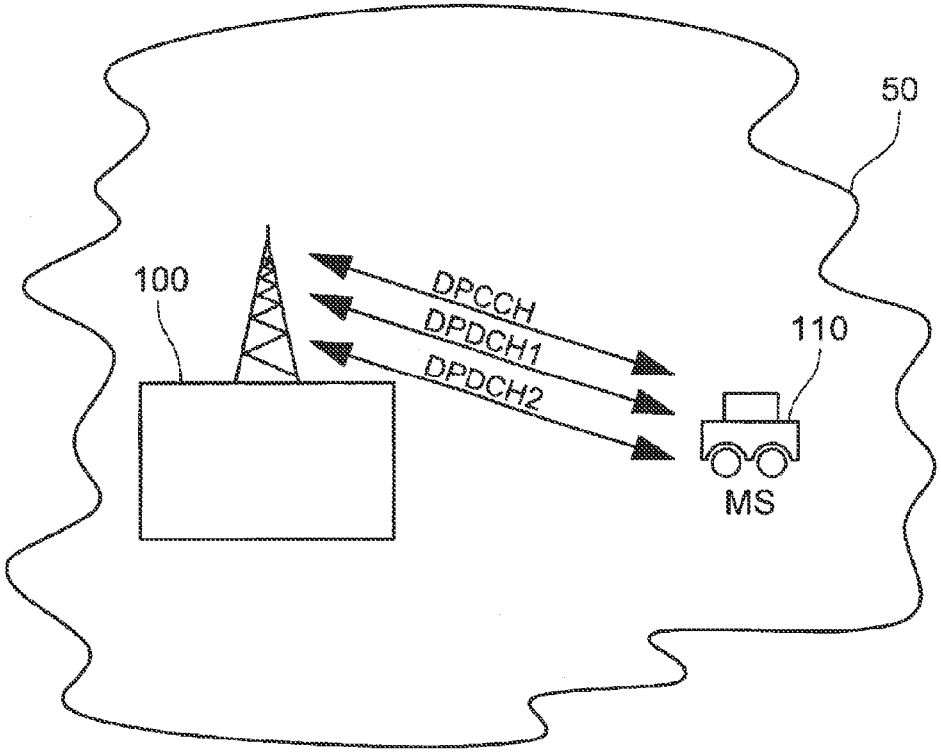
FIG. 2 illustrates a base station and mobile station communicating in a radiocommunication system.

FIG. 2 illustrates an exemplary cell 50 in which a base station (BS) 100 communicates with a mobile station (MS) 110. Although one MS 110 is shown, those skilled in the art will appreciate that the base station 100 may support connections with many mobile stations concurrently. For purposes of this description, interaction between a single MS and the network is sufficient to illustrate power control techniques according to the present invention. For the purposes of this exemplary embodiment, consider that the system depicted in FIG. 2 operates using a CDMA technology with duplexed downlink and uplink channels. In this example, MS 110 is allocated three uplink/downlink physical channels DPCCH, DPDCH1, and DPDCH2, as indicated by the three bidirectional arrows. Of course, those skilled in the art will appreciate that the physical channels are unidirectional in nature and that an MS may have a different number of physical channels allocated to it in the downlink than in the uplink. For example, an Internet connection may require more downlink bandwidth than uplink bandwidth. The data rate may also be different on the downlink and the uplink, e.g., an Internet connection may have only one channel with a high downlink data rate and a lower uplink date rate.

In the context of an exemplary W-CDMA system, a physical channel is identified by its code (i.e., channelization, scrambling, or a combination thereof) and frequency. In the downlink, the BS 100 transmits to the MS 110 using a certain power level associated with each of the physical channels. In the uplink, the MS 110 communicates with the BS 100 using a certain power level associated with each physical channel. Although not shown, the BS 100 is in communication with a Radio Network Controller (RNC) via a Mobile Switching Center (MSC), which in turn is connected to a Public Switched Telephone Network (PSTN).

Figure 3:
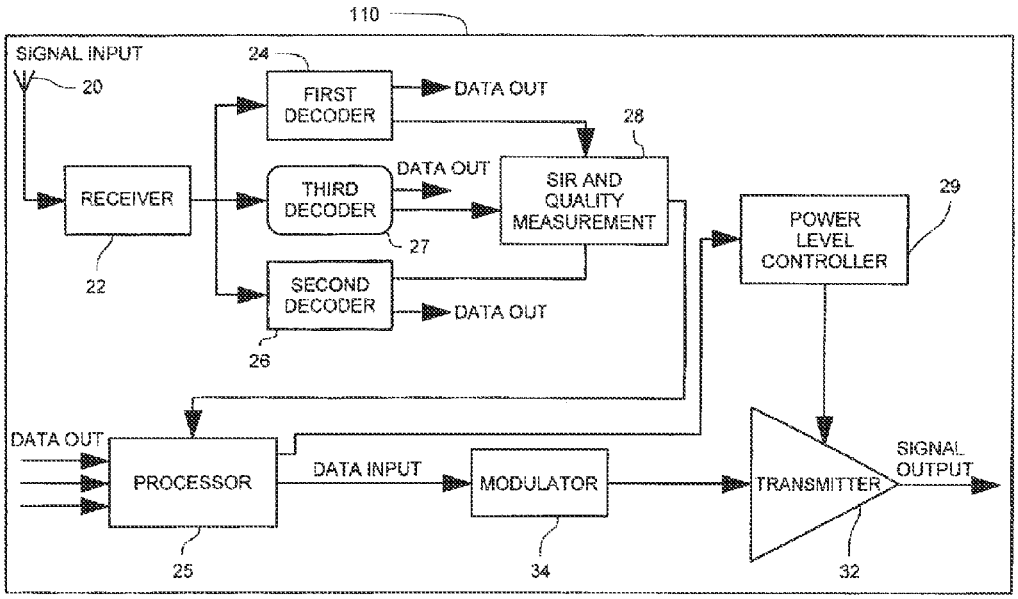
FIG. 3 illustrates an exemplary transceiver in which the present invention may be implemented.

In FIG. 3, an exemplary transceiver is shown. For the purposes of this description, the transceiver may be considered the MS 110. However, it will be appreciated that a BS may contain similar components. As shown in FIG. 3, the MS 110 includes a receiver 22 which operates in a conventional manner to filter, amplify and demodulate a signal from an antenna 20. A first decoder 24 is provided for selectively receiving and decoding a signal transmitted from the BS 100, e.g., on the DPCCH. Likewise, signals on other channels assigned to the MS 110, e.g., DPDCH1 and DPDCH2, are decoded at second and third decoders 26 and 27, respectively. The output data from these decoders is used by the processor 25 in a known manner to reconstruct and output the conveyed information, e.g., to provide the audio and video output of a wirelessly transmitted video conference. At the same time, information obtained during the decoding process can be used to determine the SIR of the signal received by the MS 110 and to perform other quality measurements, e.g., BER and FER calculations. For example, the SIR and quality measurement unit 28a can calculate the SIR of the signal received by the MS 110 as described in Equation (1) on page 2. The calculated SIR may be used by the uplink TPC decision unit 28b to determine which power control commands (i.e., "up" or "down") and power offset values to include in the messages to be sent on the uplink for use by the BS 100 in its power control unit (not shown). The BER and/or FER measurements can be performed using any known technique in the downlink quality measurement unit 28c.

The measured BER and/or FER is supplied to the processor 25 from the downlink quality measurement unit 28c. The processor 25 uses the quality measurements to adjust the power offset values which are delivered to the power level controller 29.

The information to be transmitted on the uplink on the DPCCH, DPDCH1 and DPDCH2, is further processed, e.g., modulated, and then transmitted. The power level at which the different physical channels are transmitted is controlled by the power level controller 29 and may vary between channels. The power level controller 29 controls the uplink transmit power based on the power offset values received from the BS 100 or calculated by the MS 110 and the downlink transmit power control (DLTPC) commands transmitted by the BS 100.

Figure 4:
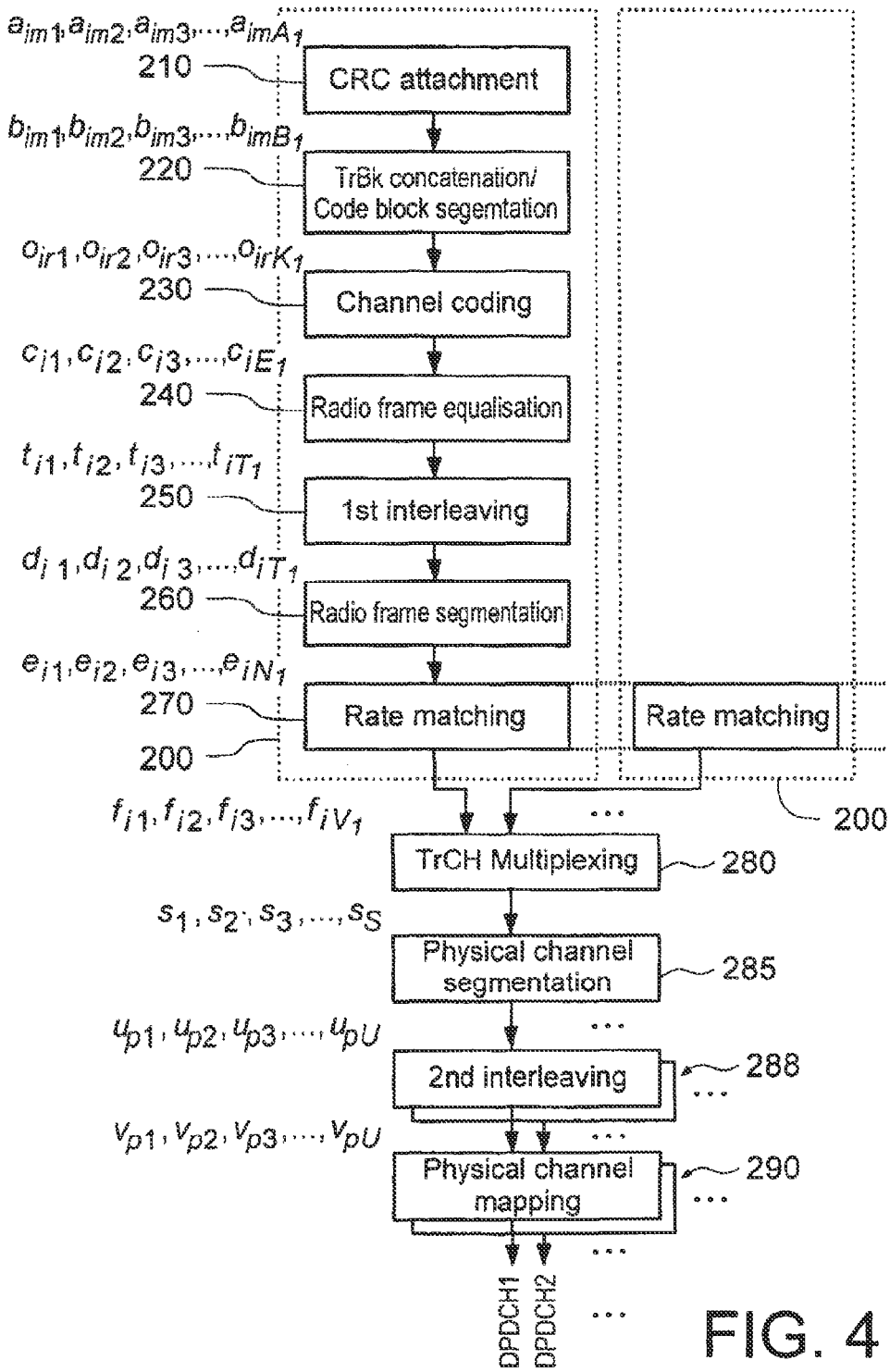
FIG. 4 depicts a transmit processing chain according to an exemplary embodiment.

Having described an exemplary base station and an exemplary mobile station for communicating information over a plurality of physical channels onto which one or more radio bearers can be mapped, and making various signal strength and quality measurements, exemplary techniques for generating the power control commands and power offset values according to the present invention will now be described with respect to FIG. 4. In FIG. 4, an exemplary transmit processing chain is depicted in which each TFC is processed using a set of function units generally designated by the reference numeral 200. Each transmitter may contain a plurality of such processing chains 200, one for each traffic channel.

A cyclic redundancy check (CRC) field is attached to a data portion associated with a first TFC in a CRC attachment unit 210. Block concatenation and code block segmentation are performed in a concatenation/segmentation unit 220. Channel coding, e.g., convalutional coding, is performed in a channel coding unit 230, and radio frame equalization operations are carried out in a radio frame equalization unit 240. The output of the radio frame equalization unit 240 is subjected to a first interleaving process at a 1st interleaving unit 250 prior to being divided into radio frames in a radio frame segmentation unit 260. The resulting radio frames undergo rate matching in a rate matching unit 270 which coordinates the transmission rates between TFCs.

The rate matching unit 270 punctures or repeats bits of data, depending on the number of bits to be transmitted on all the channels in a frame and the data rate of each channel. The amount of puncturing/repetition is proportional to a rate matching parameter (RM). The rate matching parameter RM is used to prioritize the channels and is signaled to the MS 110 from the BS 100.

The rate matched radio frames from each TFC are multiplexed together in a multiplexing unit 280 in preparation for transmission. The resulting data stream is segmented based on the physical channel into which it is to be transmitted in a segmentation unit 285, and a second interleaving process is performed in a 2nd interleaving unit 288 for each channel's data. The outputs of the 2nd interleaving units 288 are then mapped onto their respective physical channels, e.g., by spreading the output with designated spreading codes associated therewith in a physical mapping unit 290. The power levels of the transmitted physical channels are then adapted by weighting them with a gain factor in accordance with the power level offsets between the DPDCHs and the DPCCH. When a new TFC (e.g., having a different data rate than a previous TFC) is to be transmitted, a new offset value is needed.

The gain factors for a control channel and a data channel, $\beta_c$ and $\beta_d$, respectively, may be explicitly transmitted from the BS 100 to the MS 110, e.g., in the DPCCH, for each TFC as specified in the above-referenced document, "Spreading and Modulation". When the gain factors $\beta_c$ and $\beta_d$ are transmitted for each TFC, the β-values can be applied to tailor the uplink transmit power in the MS 110 at the start of the first slot where a new TFC is used. For example, the output transmit power can be changed at the same time that the β-values are changed in accordance with the following equation:

$$P_{out,current} = \frac{1 + \frac{\beta_{d,current}^2}{\beta_{c,current}^2}}{1 + \frac{\beta_{d,previous}^2}{\beta_{c,previous}^2}} P_{out,previous} + TPC \tag{2}$$

where $P_{out,previous}$ is the output power in the slot before the new TFC is used;

$\beta_{d,current}$ is the $\beta_d$ value used for the new TFC;

$\beta_{c,current}$ is at is the $\beta_c$ value used for the new TFC;

$\beta_{d,previous}$ is the $\beta_d$ value used for the previous TFC;

$\beta_{c,previous}$ is the $\beta_c$ value used for the previous TFC; and

TPC is the change in transmit power resulting from the transmit control command being transmitted according to the transmit power control procedure.

As an alternative to explicitly transmitting the gain factors values each time a TFC is changed, a mechanism can be provided by which the MS 110 and the BS 100 can calculate the power offset, e.g., based on the change in data rates used for the different TFCs. The power offset between the DPDCH and DPCCH can be determined such that (1) the transmitted $E_b$ (before coding) on the DPDCH remains constant, regardless of the data rate to be transmitted and (2) the transmit power used for the DPCCH remains constant, except for the power control power step, such that the power control mechanisms are not affected.

According to an exemplary embodiment, the power offset between the channels may be adjusted according to the bit rate of the transport channels. This solution will work well when all of the TFCs have the same coding rate and rate matching parameters, but not as well when the TFCs have different coding rates. The total coding rate has to be taken into consideration. This coding rate $R_{c,tot}$ includes the coding rate of the actual encoder, $R_c$, and the rate matching rate, $R_{c,rate}$. The total coding rate, $R_{c,tot}$, may be given by $R_{c,tot}=R_c*R_{c,rate}$. Therefore, in addition to changes in data rate, both the coding rate and rate matching parameters should be taken into account when determining how to adjust the power offset. Moreover, determination of the offset should be based on information describing the data rate before the rate matching is performed. Otherwise, only the spreading factor is taken into account, because each frame to be transmitted on the uplink is filled up after the rate matching is performed in unit 270.

The exemplary rate matching algorithm employed in the rate matching unit 270 has the property that the channel bit rate, and thereby the power setting of each TFC, is proportional to the sum $$\sum_i RM_i \cdot N_i,$$

where $N_i$ is the number of bits delivered from the radio frame segmentation unit 260 for TFC 'i', as seen in FIG. 4, and $RM_i$ is the signaled rate matching parameter for the TFC. When this information is used for the ratio of power between the DPDCH transmit power and the DPCCH transmit power, the code rate and the rate matching parameters for the different TFCs channels are taken into account, before rate matching is performed.

Taking the foregoing considerations into account, the power offset for each frame can be determined based on the following inequality:

$$\frac{\beta_{d,current}}{\beta_{c,current}} \geq \frac{\beta_{d,signaled}}{\beta_{c,signaled}} \cdot \sqrt{\frac{\left(\sum_i RM_i \cdot N_i\right)_{current}}{\left(\sum_i RM_i \cdot N_i\right)_{signaled}}} \tag{3}$$

where the index "signaled" indicates that the parameter is related to the TFC for which the β-values are signaled, and the index "current" indicates that the parameter is related to the TFC for which the β-values are to be calculated.

Figure 5:
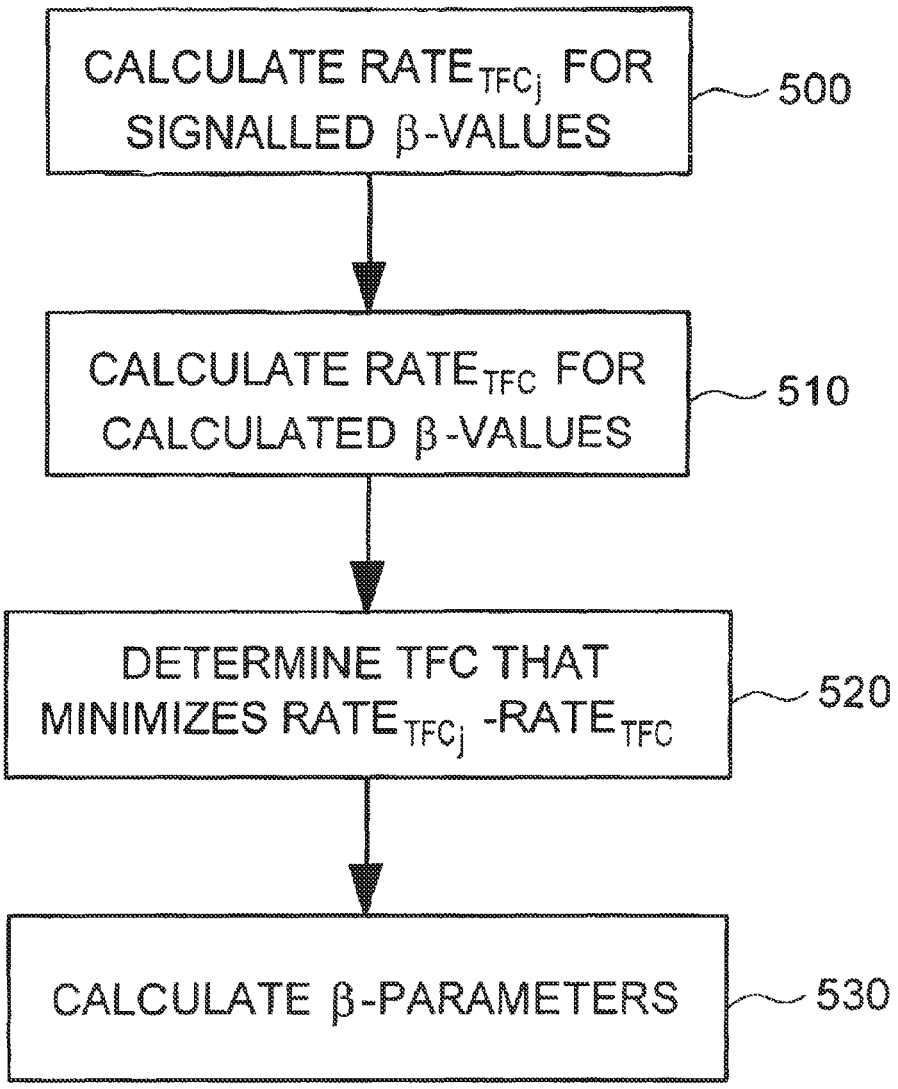
FIG. 5 illustrates an exemplary procedure for determining offset parameters.

The current β-values should be quantized to the value that yields the next higher amplitude ratio. In the interest of simplicity, one of the β-values can always be set to 1.0, and the values are thus always well defined. If $\beta_d$ is 1.0, $\beta_c$ should be quantized downwards, and if $\beta_c$ is 1.0, then $\beta_d$ should be quantized to the next higher value. More specifically, this inequality can be used to calculate the approximate β parameters using the procedure shown in FIG. 5.

At step 500, the $Rate_{TFC}$, for all TFCs is calculated where the set of β-values are signaled. The parameter $Rate_{TFCj}$ is defined for the TFC "j" as:

$$Rate_{TFCj} = \sum_i RM_i \cdot N_i \tag{4}$$

At step 510, the $Rate_{TFC}$ for the TFC is calculated where the β-values are to be calculated. At step 520, the TFC which minimizes ($Rate_{TFCj}$−$Rate_{TFC}$) is used as the base for the calculation of the β-set. At step 530, the approximate β parameters are calculated using the following equation:

$$\frac{\beta_{d,current}}{\beta_{c,current}} \geq \frac{\beta_{d,signaled}}{\beta_{c,signaled}} \cdot \sqrt{\frac{\left(\sum_i RM_i \cdot N_i\right)_{current}}{\left(\sum_i RM_i \cdot N_i\right)_{signaled}}} \tag{5}$$

$$\text{If } \frac{\hat{\beta}_{d,current}}{\hat{\beta}_{c,current}} > 1.0, \textit{ then } \beta_{d,current} = 1.0 \text{ and}$$

$$\beta_{c,current} = \text{quantized}\left[\frac{\hat{\beta}_{c,current}}{\hat{\beta}_{d,current}}\right]$$

where "quantized" means quantized to a next higher value. In this case, $\beta_{c,current}$ is the power offset.

$$\text{If } \frac{\hat{\beta}_{d,current}}{\hat{\beta}_{c,current}} < 1.0, \text{ then } \beta_{c,current} = 1.0 \text{ and}$$

$$\beta_{d,current} = \text{quantized}\left[\frac{\hat{\beta}_{c,current}}{\hat{\beta}_{d,current}}\right]$$

where "quantized" means quantized to a next lower value. In this case, $\beta_{d,current}$ is the power offset.

The output power at the transmit antenna after the power offset is changed can be controlled such that the current frame of DPCCH remains at the same power as the previous frame, except for any power change created by the inner loop power control procedure. Thus for the DPCCH there will be a power step between the previous slot and the current slot, which is the first slot with the new rate matching.

The power offsets determined for each physical data channel can be used to transmit information on those channels at different power levels using any desired circuit configuration. An exemplary device for implementing these power offsets is illustrated in FIG. 6. In FIG. 6, each of DPDCH1, DPDCH2 and DPCCH are spread by their unique spreading codes $C_{SPREAD,DPDCH1}$, $C_{SPREAD,DPDCHH1}$, $C_{SPREAD,DPCCH}$ at mixers 600, 610 and 620, respectively. In FIG. 6, $\beta_c$ is assumed to be 1. Thus, no weighting of the control channel DPCCH is needed. Prior to being summed with the other physical channels at an adder 660 and scrambled at a mixer 670, DPDCH1 is adjusted (amplified) by a variable gain amplifier 630. The gain of the amplifier [640] *630* is set by the power control commands delivered from the power control unit 650 (e.g., the power level controller 29 of MS 110) as well as the gain factors according to Equation 1. The β values are calculated, e.g., in the power control unit 650, based on the received power control commands, the data rate and rate matching parameters of all the channels as well as the signalled offset parameters. The transmit power of DPDCH2 is offset from that of the DPCCH in a similar manner using the power control unit [640] *650*. Power control commands received from, e.g., the BS 100, are used at the amplifier 680 to adjust the output signal.

Figure 7:
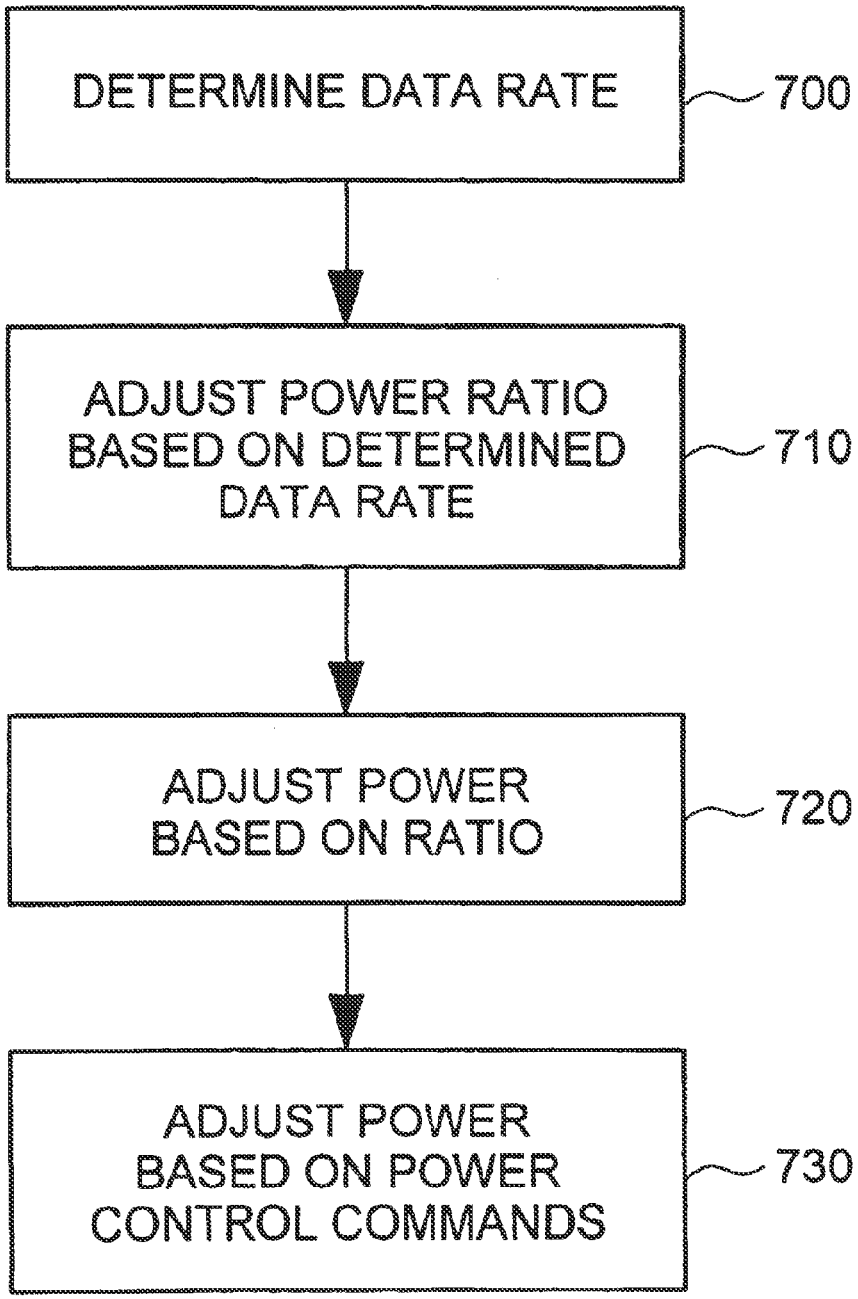
FIG. 7 illustrates a method for adjusting transmit power according to an exemplary embodiment.

FIG. 7 illustrates a method for adjusting a transmit power according to exemplary embodiments. The method begins at step 700 at which a data rate of at least a first channel, e.g., a data channel, is determined. For simplicity of illustration, only one data channel is described. However, it will be appreciated that several data channels can be used. At step 710, a ratio of power between the first channel and the second channel, e.g., a control channel, is adjusted based on the determined data rate, e.g., a data transmission rate. The ratio may also be adjusted based on a coding rate and/or a rate matching parameter. The rate matching parameter may be calculated in the manner described in FIG. 5 or it may be received, e.g., from a base station. At step 720, the transmit power of the first channel is adjusted based on the adjusted ratio. Although steps 710 and 720 have been illustrated separately for ease of explanation, it will be appreciated that these steps may be performed at the same time, i.e., the power may be adjusted as the ratio is adjusted. At step 730, the transmit power of the first and second channels is adjusted based on power control commands.

According to exemplary embodiments, a technique is provided for handling a power offset between channels such as data channels and control channels. The technique ensures that signals are transmitted with sufficient output power while minimizing interference between signals.

According to exemplary embodiments of the present invention, by setting the power offset between the DPDCH and the DPCCH to be proportional to the number of bits output from a radio frame segmentation unit and to rate matching parameters used in a rate matching unit, the power offset will be proportional to the rate of the transport channel. When the data rate of a DPDCH changes, the output power and the amplitude ratio between the DPDCH and DPCCH are changed in a manner which can be determined by a terminal, e.g., a mobile station. In this way, both the power control loop and the manner in which the DPCCH is detected are unaffected because the power of the DPCCH is not changed due to a changed TFC. At the same time, the data transmitted on the DPDCH is transmitted using the same bit energy, which implies that performance, e.g., received signal quality, on the DPDCH is, in general, unaffected.

Although in the exemplary embodiments described above, a user is allocated a DPCCH which can be used as a reference channel with respect to which power offset commands can be generated for associated DPDCHs, those skilled in the art will appreciate that some systems may not utilize DPCCHs in this manner. If a DPCCH is not allocated to a user, then any other channel, e.g., one of the DPDCHs, can be used as the reference channel.

It will be understood that Applicants' invention is not limited to the particular embodiments described above and that modifications may be made by persons skilled in the art. For example, a reference TFC can be used which includes a flag that is transmitted which can be used as a base for determining how to set the power offset. The scope of Applicants' invention is determined by the following claims, and any and all modifications that fall within that scope are intended to be included therein.

What is claimed is:

1. A method for controlling transmit power, comprising the steps of:

determining a data rate of at least a first channel *of a transmitter*;

controlling the transmit power of the at least first channel based on the determined data rate *using a power level controller*; and adjusting a ratio of power between the at least first channel and a second channel based on the data rate of the *at least* first [data] channel, wherein the transmit power of the at least first channel *of the transmitter* is controlled using the adjusted ratio.

2. The method of claim 1, wherein the *at least* first [data] channel is a data channel, and the second [data] channel is a control channel.

3. The method of claim 1, wherein the ratio is adjusted such that a power offset between the *at least* first channel and the second channel is proportional to the data rate of the *at least* first channel.

4. The method of claim 1, wherein the ratio is adjusted based on [the] *a* coding rate *of the at least first channel*.

5. The method of claim 1, wherein the ratio is adjusted based on [the] *a* data transmission rate *of the at least first channel*.

6. The method of claim 1, wherein the ratio is adjusted based on a rate matching parameter *of the at least first channel*.

7. The method of claim 1, further comprising receiving power control commands and adjusting the transmit power based on the received power control commands.

8. An apparatus for controlling transmit power, comprising:

means for determining a data rate of at least a first channel *of a plurality of channels of a transmitter*;

means for controlling the transmit power of the at least first channel *of the plurality of channels* based on the determined data rate; and means for adjusting a ratio of power between the at least first *channel of the plurality of* channels *of the transmitter* and a second *channel of the plurality of* channels based on the data rate of the at least first channel, wherein the means for controlling the transmit power uses the adjusted ratio.

9. The apparatus of claim 8, wherein the *at least* first [data] channel is a data channel, and the second [data] channel is a control channel.

10. The apparatus of claim 8, wherein the ratio is adjusted such that power offset is proportional to the data rate of the *at least* first channel.

11. The apparatus of claim 8, wherein the ratio is adjusted based on [the] *a* coding rate *of the at least first channel*.

12. The apparatus of claim 8, wherein the ratio is adjusted based on [the] *a* data transmission rate *of the at least first channel*.

13. The apparatus of claim 8, wherein the ratio is adjusted based on a rate matching parameter *of the at least first channel*.

14. The apparatus of claim 8, further comprising means for adjusting the power of the *at least* first *channel* and second [channel] *channels* based on power control commands.

*15. The method of claim 1, wherein:*

*the at least first channel is a Dedicated Physical Data Channel,*

*the second channel is a Dedicated Physical Control Channel,*

*adjusting the ratio comprises determining the adjusted ratio based on:*

$$\frac{\beta_{d,signaled}}{\beta_{c,signaled}} \cdot \sqrt{\frac{[\Sigma_i RM_i \cdot N_i]_{current}}{[\Sigma_i RM_i \cdot N_i]_{signaled}}}$$

*where $\beta_{d,signaled}$ is a signaled gain for the Dedicated Physical Data Channel, $\beta_{c,signaled}$ is a signaled gain for the Dedicated Physical Control Channel, $RM_i$ is a rate matching parameter for transport channel i, $N_i$ is a number of bits delivered from a radio frame segmentation unit for transport channel i, $[\Sigma_i RM_i \cdot N_i]_{current}$ is a summation for each transport channel i in the current transport format configuration of the Dedicated Physical Data Channel, and $[\Sigma_i RM_i \cdot N_i]_{signaled}$ is a summation for*

*each transport channel i in a signaled transport format configuration of the Dedicated Physical Data Channel.*

*16. The method of claim 15, wherein determining the data rate comprises determining the data rate to be* $[\Sigma_t RM_t \cdot N_t]_{current}$, *where* $RM_t$ *is a rate matching parameter for transport channel i,* $N_t$ *is a number of bits delivered from a radio frame segmentation unit for transport channel i,* $[\Sigma_t RM_t \cdot N_t]_{current}$ *is a summation for each transport channel i in a current transport format configuration of the Dedicated Physical Data Channel.*

*17. The apparatus of claim 8, wherein the means for determining the data rate comprise a signal interference ratio and quality measurement unit, the means for controlling transmit power of the at least first channel comprise a power level controller, and the means for adjusting the ratio comprise a processor.*

*18. The apparatus of claim 17, wherein:*

*the at least first channel is a Dedicated Physical Data Channel,*

*the second channel is a Dedicated Physical Control Channel,*

*adjusting the ratio comprises determining the adjusted ratio based on:*

$$\frac{\beta_{d,signaled}}{\beta_{c,signaled}} \cdot \sqrt{\frac{[\Sigma_t RM_t \cdot N_t]_{current}}{[\Sigma_t RM_t \cdot N_t]_{signaled}}},$$

*where* $\beta_{d,signaled}$ *is a signaled gain for the Dedicated Physical Data Channel,* $\beta_{c,signaled}$ *is a signaled gain for the Dedicated Physical Control Channel,* $RM_t$ *is a rate matching parameter for transport channel i,* $N_t$ *is a number of bits delivered from a radio frame segmentation unit for transport channel i,* $[\Sigma_t RM_t \cdot N_t]_{current}$ *is a summation for each transport channel i in the current transport format configuration of the Dedicated Physical Data Channel, and* $[\Sigma_t RM_t \cdot N_t]_{signaled}$ *is a summation for each transport channel i in a signaled transport format configuration of the Dedicated Physical Data Channel.*

*19. The apparatus of claim 18, wherein determining the data rate comprises determining the data rate to be* $[\Sigma_t RM_t \cdot N_t]_{current}$, *where* $RM_t$ *is a rate matching parameter for transport channel i,* $N_t$ *is a number of bits delivered from a radio frame segmentation unit for transport channel i,* $[\Sigma_t RM_t \cdot N_t]_{current}$ *is a summation for each transport channel i in a current transport format configuration of the Dedicated Physical Data Channel.*

*20. The apparatus of claim 8, wherein:*

*the at least first channel is a Dedicated Physical Data Channel,*

*the second channel is a Dedicated Physical Control Channel,*

*adjusting the ratio comprises determining the adjusted ratio based on:*

$$\frac{\beta_{d,signaled}}{\beta_{c,signaled}} \cdot \sqrt{\frac{[\Sigma_t RM_t \cdot N_t]_{current}}{[\Sigma_t RM_t \cdot N_t]_{signaled}}},$$

*where* $\beta_{d,signaled}$ *is a signaled gain for the Dedicated Physical Data Channel,* $\beta_{c,signaled}$ *is a signaled gain for the Dedicated Physical Control Channel,* $RM_t$ *is a rate matching parameter for transport channel i,* $N_t$ *is a number of bits delivered from a radio frame segmentation unit for transport channel i,* $[\Sigma_t RM_t \cdot N_t]_{current}$ *is a summation for each transport channel i in the current transport format configuration of the Dedicated Physical Data Channel, and* $[\Sigma_t RM_t \cdot N_t]_{signaled}$ *is a summation for each transport channel i in a signaled transport format configuration of the Dedicated Physical Data Channel.*

* * * * *